United States Patent [19]
LoPresti et al.

[11] Patent Number: 5,588,619
[45] Date of Patent: Dec. 31, 1996

[54] PROPELLER SYNCRO-PULSING

[76] Inventors: Leroy LoPresti, 2050 13th; Jim LoPresti, 2620 Airport N. Dr., both of Vero Beach, Fla. 32960

[21] Appl. No.: 343,042

[22] Filed: Nov. 21, 1994

[51] Int. Cl.$^6$ ................................................ B64C 11/00
[52] U.S. Cl. ..................... 244/53 R; 123/559.1; 244/65
[58] Field of Search ................. 244/53 R, 53 B, 244/69, 65, 59; 123/559.1; 416/239, 25, 29, 27, 235

[56] References Cited

U.S. PATENT DOCUMENTS

| | | | |
|---|---|---|---|
| 1,907,454 | 5/1933 | Squires | 123/559.1 |
| 1,916,956 | 7/1933 | Lake | 244/53 R |
| 1,929,886 | 10/1933 | Gosslau | 123/559.1 |
| 1,990,979 | 2/1935 | Chiltor | 244/53 R |
| 2,022,900 | 12/1935 | Paulecke | 123/559.1 |
| 2,399,828 | 5/1946 | Roche | 416/239 |
| 2,514,487 | 7/1950 | Griese | 416/239 |
| 2,592,214 | 4/1952 | Wallace | 416/239 |

*Primary Examiner*—Galen L. Barefoot

[57] ABSTRACT

Indexing a propeller blade so it leads intake valve timing by a specific amount causes an increase in engine power. The proper indexing allows the high energy propeller wake in the form of an acoustic wave to be ingested by the induction system and arrive at the intake valve just as the valve is opening. When the Wave arrives just as the valve is opening, the wave causes a momentary increase in manifold pressure which adds pumping potential to force additional airflow into the engine cylinders which results in a power increase. This technique called propeller syncro-phasing causes the propeller blade to behave as a "zero stage supercharger". Adding a trailing edge extension to the propeller blade chord at the radius corresponding to the induction inlet causes a local increase in slipstream total energy adding additional energy to the induction airflow resulting in additional engine power. There has been no device marketed to exploit either of these two phenomena, nor has there been any publication which speaks of this technique that I have seen. In this regard propeller syncro-pulsing is unique.

1 Claim, 1 Drawing Sheet

PROPELLER SYNCRO-PULSING

BRIEF SUMMARY

All aircraft propellers leave a high energy wake at their trailing edge which travels aft in a helical pattern. This high energy airflow enters the induction air inlet as an acoustic wave and travels thru the system until it reaches each cylinder's intake valve. If the valve is closed at the arrival time, the wave is reflected as another acoustic wave. If the wave arrives at the intake valve during the period the valve is open, the acoustic wave will add energy to the induction airflow which results in a power increase. Syncro-pulsing involves indexing the propeller position relative to the crankshaft effectively synchronizing the propeller blades and the engine cylinders so that each pulse from the propeller reaches each cylinder at the precise time to provide an increase in manifold pressure and hence greater engine power at the desired engine RPM.

For syncro-pulsing to work efficiently in a four cylinder engine it is neccessary to have half as many propeller blades as there are number of engine cylinders. For syncro-pulsing to occur at a fixed RPM the angular "lead or lag" of the propeller blades passing the induction inlet relative to inlet valve opening defines the time required for the high energy pulse to travel thru the induction system with normal gas flow to arrive at the cylinder head just as the valve opens.

The total energy in the slipstream in the region near the induction inlet may be augmented through the use of a propeller blade trailing edge chord extension which locally increases the blades influence on the slipstream, suppling greater energy to the induction system.

BRIEF DESCRIPTION OF DRAWING VIEWS

The enclosed drawing shows a typical blade trailing edge extension and its relation to the induction system. FIG. 1 shows a typical propeller blade (-4 in FIG. 1) with its trailing edge to the right. The chord extension is shown as -2 in FIG. 1. The propeller is driven by an internal combustion engine shown as -7 in FIG. 1. The propeller is connected to the engine by the crankshaft shown as -5 in FIG. 1. The external induction inlet shown as -3 in FIG. 1 is connected to the engine inlet valve shown as -6 in FIG. 1. FIG. 2 shows a typical cross section through the blade including the trailing edge chord extension. The blade is shown as -4 and the extension is shown as -2.

DETAILED DESCRIPTION

Figure 1:
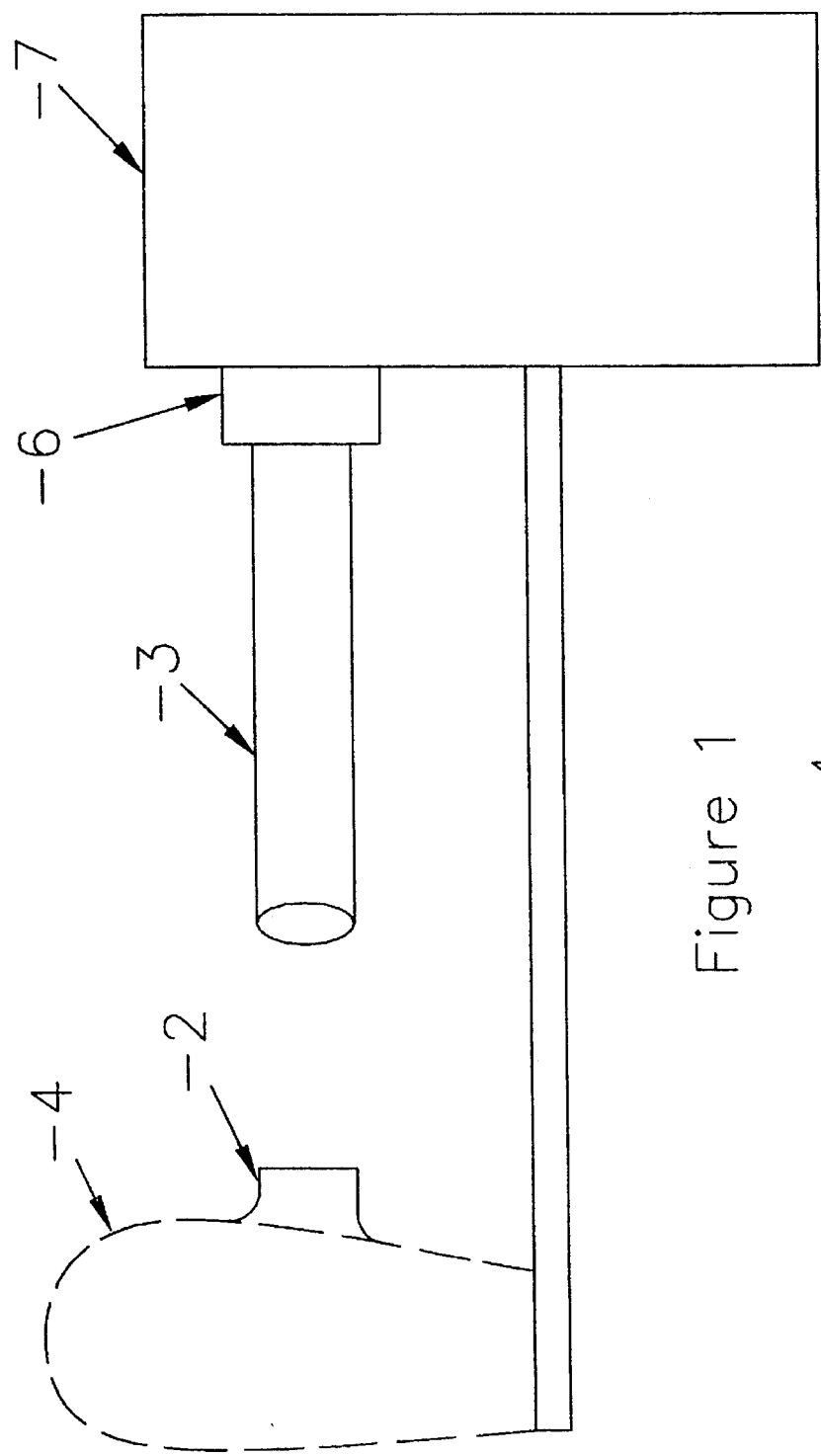
Figure 2:
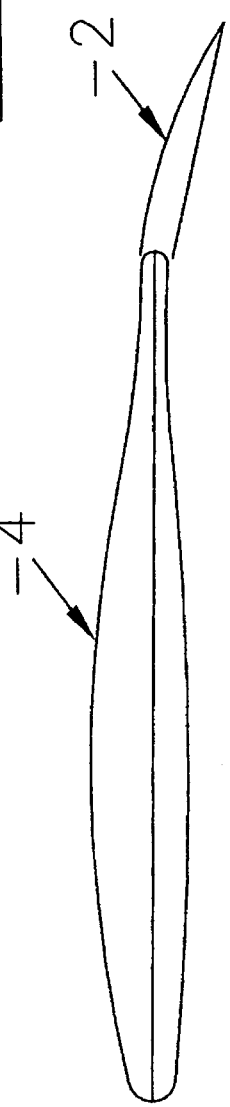

Propeller syncro-pulsing utilizes the propeller wake to increase engine power. Propeller syncro-pulsing involves synchronizing the arrival of the propeller wake's acoustic pulse with the opening of each cylinder's intake valve (-6 in FIG. 1). The propeller sycro-pulsing technique requires appropriate indexing of the propeller blades relative to the crankshaft (-5 in FIG. 1). The propeller blade must sweep past the induction inlet (-3 in FIG. 1) before the intake valve opens to allow time for the pulse to travel thru the system and arrive at the intake valve while it is opening. For example, if the induction system length from the propeller trailing edge to the intake valve is 64" and syncro-pulsing is desired at 2700 RPM, the blade must sweep past the induction inlet 53 degrees prior to intake valve opening.

For a four cylinder four stroke engine, a two blade propeller is required. The first blade services cylinder 1 and 3, the second blade services cylinders 2 and 4. A six cylinder engine requires a three blade propeller for propeller syncro-pulsing to occur.

A propeller blade chord trailing edge extension at the blade radius corresponding to the induction inlet can increase the average total pressure of the slipstream. This trailing edge extension adds energy by causing an increase in local lift; this higher energy provided by the extra lift caused by the blade chord extension is intercepted by the induction inlet which in turn creates greater manifold pressure and horsepower.

We claim:

1. An improvement in the combination of an aircraft propeller and an internal combustion engine comprising:

said aircraft propeller providing a high energy wake at its trailing edge which travels aft in a helical pattern and provides a driving thrust, and said aircraft propeller being driven by said internal combustion engine;

said improvement comprising: said internal combustion engine having an induction inlet in close proximity to a portion of said propeller, said propeller having a blade extension located on said propeller at said portion in close proximity to said induction inlet and said propeller being indexed in relation to the opening and closing of an inlet valve of said internal combustion engine such that an impulse of air created by said blade extension will enter said induction inlet and arrive at said intake valve when it is open, thereby resulting in an additional power increase from said internal combustion engine.

* * * * *